E. RICE.
Spool-Holder

No. 204,758. Patented June 11, 1878.

WITNESSES:
William W. Hallett
Warren R. Perce

INVENTOR:
Edward Rice

UNITED STATES PATENT OFFICE.

EDWARD RICE, OF PROVIDENCE, RHODE ISLAND.

IMPROVEMENT IN SPOOL-HOLDERS.

Specification forming part of Letters Patent No. 204,758, dated June 11, 1878; application filed May 3, 1878.

*To all whom it may concern:*

Be it known that I, EDWARD RICE, of the city and county of Providence, in the State of Rhode Island, have invented an Improved Protector for Spools; and declare the following to be a specification thereof, reference being had to the accompanying drawings.

Like letters indicate like parts.

Figure 1:
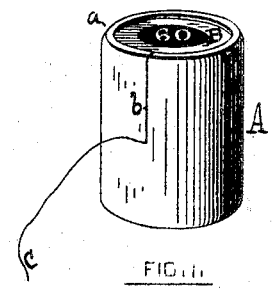
Figure 2:
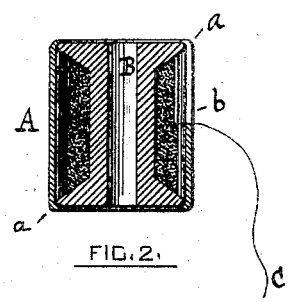
Figure 3:
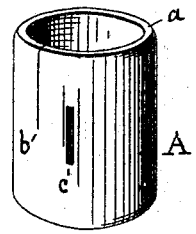

Figure 1 is a perspective view of my invention. Fig. 2 is a vertical section of the same. Fig. 3 shows the cylinder separately, in perspective.

My invention is designed for use upon spools of thread, rolls of tape, braid, cord, gimp, or ribbon, and for other similar purposes.

It consists of a cylinder having a suitable spring, whereby it can receive and retain a spool or roll revolving within it, and having also a longitudinal slit or aperture, through which the thread or tape, in being unreeled, passes out from the spool for use.

The cylinder A may be made of paper, sheet metal, paper or wood pulp, papier-maché, rubber, or other suitable material. It should be made of sufficient diameter and length to loosely inclose the spool B, allowing a free revolution within. At each end of the cylinder I mold or turn inwardly the edge, forming a ledge or lip, *a*, to slightly shut over the ends of the inclosed spool and secure it in place. If paper or other friable material is used in the construction, it is advisable to use glue or other sizing in molding the edge, to give it increased strength, firmness, and rigidity. A longitudinal slit, *b*, is cut through the body of the cylinder upon one side, extending from the upper edge to a distance, preferably, of one-half the length of the cylinder. By thus dividing the upper edge or circumference I convert the upper portion of the cylinder into a spring, allowing the ready insertion and subsequent locking of the spool in position, the upper part of the cylinder being spread slightly apart by means of the slit or cut, to receive the spool, and in regaining its normal position shutting its lips or ledge over the end of the spool sufficiently to prevent it from falling out. When it is desired to remove the spool a slight upward pressure upon the bottom of the spool easily crowds it out, beyond, and free from the confinement of the ledge or lips *a*. This slit *b* serves the further purpose of furnishing a proper aperture for the thread C as it is unwound and drawn from the spool. The thread passing through this opening presents its free end outside the cylinder for use.

For tape, cord, braid, ribbon, or other larger or thicker twists or fabrics, this slit *b* would not be available; but a central aperture or hole, *c*, should be cut, to allow the passage of the tape, &c., without friction. The slit *b*, however, should be used for its purpose as furnishing a spring, as above described.

I do not, however, wish to confine myself to the use of this particular form of spring, as other forms will accomplish the same result equally well. The form shown is more inexpensive than if separately made and affixed.

Instead of locking in the spool by means of a molded or turned edge, a groove or channel may be rolled in the circumference of the cylinder to form an internal shoulder for the same purpose, or a series of indentations may serve to retain the spool in place.

The advantages of the use of my invention are twofold. The free end of the thread is always presented for ready handling, and is never lost under or between the windings of adjacent coils, and also, though freely presented, is securely held from unwinding and tangling, thus preventing the common waste arising from this cause. My cylinder further serves to protect the exposed surface of the thread from stain and dirt, and prevents the spotting or fading of such threads or ribbons as, being of delicate or sensitive tints, are liable to such injury by improper exposure.

I am aware that cylindrical coverings or protectors open on one side for the adjustment of the same upon spools are not new, nor do I desire to claim such a construction, broadly; but What I do claim as new and useful is—

As an improved article of manufacture, the herein-described spool-protector, consisting of the cylinder A, having inwardly-projecting flanges *a* extending around its upper and lower edges, and provided with the slit *b* and aperture *c*, substantially as and for the purpose specified.

EDWARD RICE.

Witnesses:
WILLIAM B. W. HALLETT,
WARREN R. PERCE.